(12) United States Patent
Sears et al.

(10) Patent No.: US 6,327,933 B1
(45) Date of Patent: Dec. 11, 2001

(54) CRANKSHAFT PARTING LINE STRATEGY

(75) Inventors: Ronald M. Sears, West Bloomfield; Rick L. Williams, Canton; Shaji Mathews, Redford, all of MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 09/404,127

(22) Filed: Sep. 23, 1999

(51) Int. Cl.⁷ ............................ F16C 11/00; F16C 3/04
(52) U.S. Cl. ........................................ 74/603; 74/595
(58) Field of Search ............................ 74/603, 595, 596, 74/598, 604; 29/6, 888.08

(56) References Cited

U.S. PATENT DOCUMENTS 3,897,817    8/1975   Nieman .
4,829,642    5/1989   Thomas et al. .
5,481,942  * 1/1996   Baek ........................................ 74/603

FOREIGN PATENT DOCUMENTS 24 24 590 A1   12/1975  (DE) .
58-132342  *   8/1983   (JP) ...................................... 29/6.01
63-5839    *   1/1988   (JP) ...................................... 29/6.01

* cited by examiner

Primary Examiner—Sherry Estremsky
Assistant Examiner—Tisha D. Lewis
(74) Attorney, Agent, or Firm—Jerome R. Drouillard

(57) ABSTRACT

A parting line strategy for a crankshaft (100) includes providing a parting line that has a plurality of portions that extend across a plurality of cheeks (104, 106, 108) and pins (120, 126, 136, 142, 152, 158). Further, the parting line has a portion (126, 142, 158) that extends generally diagonally across a face (168) of each of the plurality of cheeks (104, 106, 108) to assist in removing flash from the crankshaft (108).

14 Claims, 2 Drawing Sheets

CRANKSHAFT PARTING LINE STRATEGY

TECHNICAL FIELD

The present invention relates generally to the casting of crankshafts. More particularly, the present invention relates to a cast crankshaft parting line strategy that aids in the molding and trimming processes of the crankshaft without detrimental design impact.

BACKGROUND ART

In the manufacture of metal casting, superfluous metal is often formed about the periphery of the casting coincident to where the parting line of the casting mold intersects the casting cavity. One common cause of such superfluous metal is the flashing of metal along the parting line due to imperfectly mating parting surfaces on the opposite elements on the mold. Various attempts to minimize flashing have been utilized, however, it is virtually impossible to eliminate all flash during the casting process on a consistent basis. Thus, subsequent processes must be utilized in order to remove the flash before the cast metal part may be commercially utilized.

An example of a cast metal part is a crankshaft for an internal combustion engine, which is typically formed from known casting processes. These casting processes are no different than other metal casting processes, in that metal flashing typically remains on the crankshaft coincident to the parting line after the crankshaft has been removed from the mold. Therefore, subsequent processes must be utilized in order to remove the metal flash that accumulates on the crankshaft parting line. These subsequent processes are relatively time consuming and expensive.

One of the problems with the removal of flash with current crankshaft configurations is that the parting lines are located along the edges of some of the parts and are therefore perpendicular to the axis of the crankshaft. This perpendicular orientation of the metal flash is extremely stiff and very difficult to remove with current trim die machines. In fact, the stiffness of the flash that results from the perpendicular orientation of the metal flash with respect to the crankshaft edges generates a tremendous load on the trim die machine, which can cause failure of the machine and thus significantly increase the expense of the manufacturing process. Because of the inability of the trim die machines to adequately remove the metal flash, the flash is often removed by hand which further increases, the cost of and the time required to complete the manufacturing process.

SUMMARY OF THE INVENTION

It is therefore an object of the present invention to provide a cast parting line strategy for a crankshaft that facilitates the molding and deflashing operations.

It is a further object of the present invention to provide a crankshaft configuration that results in metal flash at mold parting lines that can be easily removed mechanically.

In accordance with the objects of the present invention a crankshaft with an improved parting line strategy is provided. The crankshaft includes a plurality of cheeks, including a three cheek, a four cheek, a five cheek, and a six cheek. The three cheek and the four cheek are connected by a two pin, the four cheek is in turn connected to the five cheek by a main journal pin, and the five cheek is connected to the six cheek by a three pin. The crankshaft parting line has a plurality of portions. The first parting line portion extends generally across an outer surface of the two pin along its centerline. The second parting line portion extends generally upward and diagonally across the face of the four cheek beginning at one edge at a point along the centerline of the two pin and terminating at an opposing edge of the four cheek at a point along a centerline of the main journal pin. The third parting line portion extends generally across an outer surface of the main journal pin along its centerline. The fourth parting line portion extends generally upward and diagonally across the face of the five cheek beginning at one edge at a point along the centerline of the main journal pin and terminating at an opposing edge of the five cheek at a point along a centerline of the three pin. The fifth parting line portion extends generally across an outer surface of the four pin along its centerline. The sixth parting line portion extends generally downward and diagonally across the face of the six cheek beginning at one edge at a point along the centerline of the three pin and terminating at a point along a centerline of a five pin.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
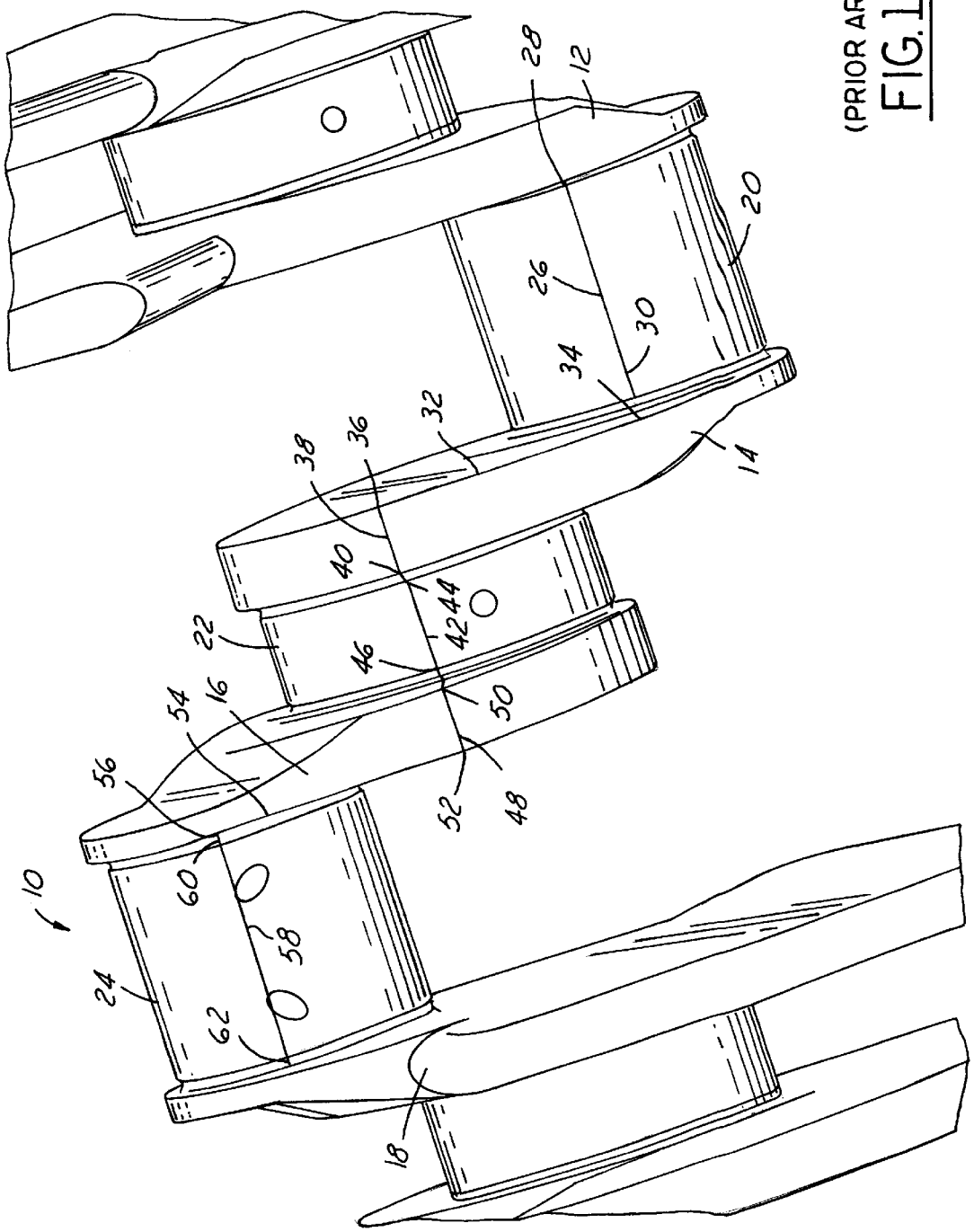
FIG. 1 is a schematic illustration of a crankshaft illustrating a known prior art parting line strategy.

A typical prior art parting line geometry or strategy for a crankshaft is illustrated in FIG. 1. The crankshaft 10 includes a three cheek 12, a four cheek 14, a five cheek 16, and a six cheek 18. The three cheek 12 is connected to the four cheek 14 by a two pin 20. The four cheek 14 is connected to the five cheek 16 by a main journal 22. The five cheek 16 is connected to the six cheek 18 by a three pin 24.

As shown, this typical parting line geometry follows the edge of the internal cheeks 14, 16 as the mold changes direction. This configuration is utilized to accommodate the horizontal pin areas of the crankshaft 10. This configuration is also utilized because of the bulges or protrusions that are present on the cheeks for strength and balance, The parting line has a first portion 26 that extends generally horizontally (parallel to the axis of rotation of the crankshaft) across the surface of the two pin 20 between points 28 and 30. The parting line has a second portion 32 that extends along the edge of the four cheek 14 and is located generally perpendicular to the axis of rotation of the crankshaft 10 between points 34 and 36.

The parting line has a third portion 38 that extends generally horizontal across the surface of the fourth cheek 14 between points 36 and 40. A fourth portion 42 of the parting line then extends generally horizontal across the surface of the main journal 22 between points 44 and 46. A fifth portion 48 of the parting line also extends generally horizontal across the surface of the five cheek 16 between points 50 and 52. The parting line has a sixth portion 54 that extends along the edge of the five cheek 16 and generally perpendicular to the axis of rotation of the crankshaft 10 between points 52 and 56. A seventh portion 58 of the parting line also extends generally horizontal across the surface of the three pin 24 between points 60 and 62.

Figure 2:
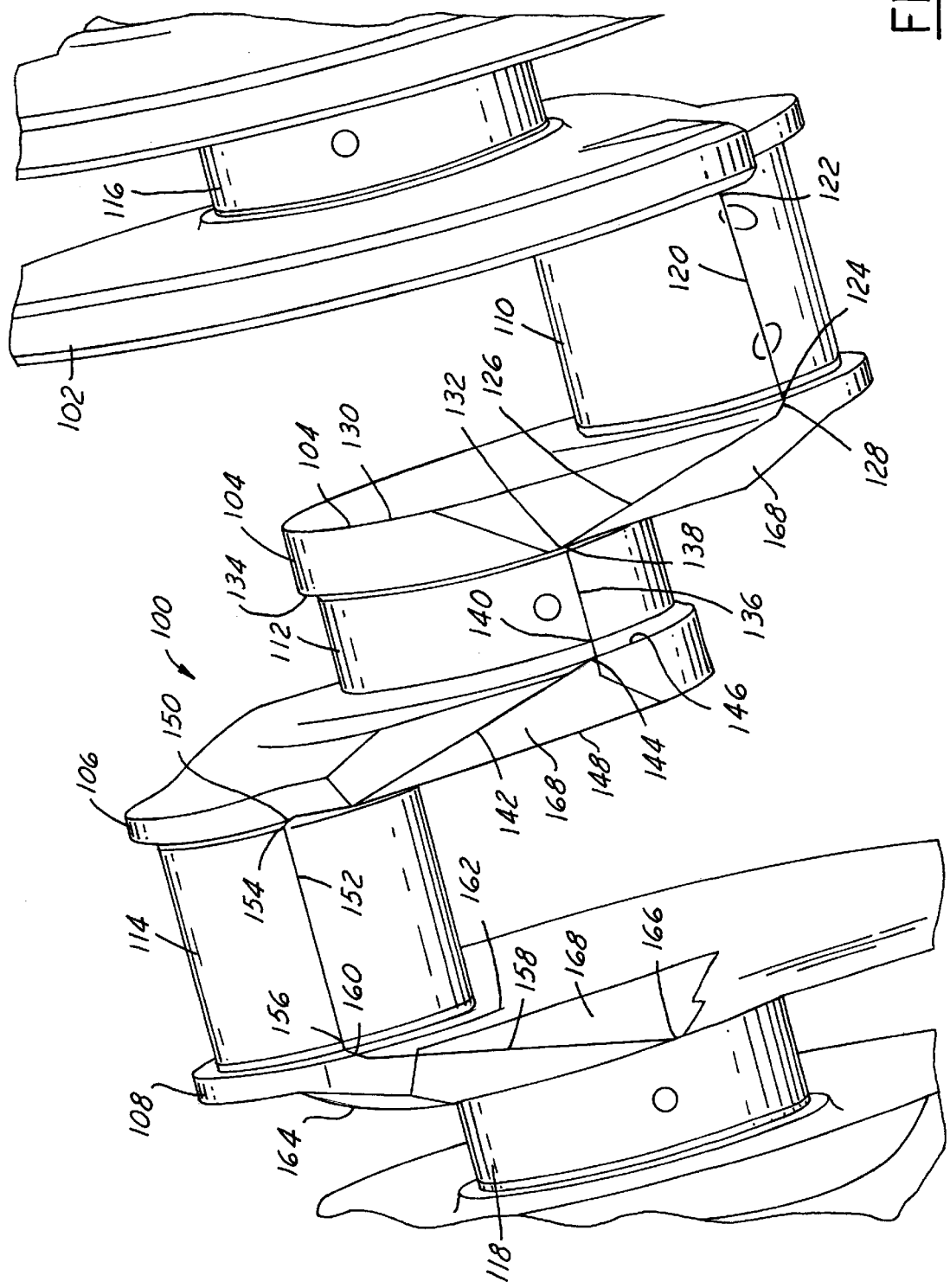
FIG. 2 is a schematic illustration of a crankshaft illustrating a parting line strategy in accordance with a preferred embodiment of the present invention.

Referring now to FIG. 2 which illustrates a crankshaft 100 in accordance with a preferred embodiment of the present invention. The crankshaft 100 has an unique parting line geometry or strategy, as is discussed in more detail below. The crankshaft 100 includes a three cheek 102, a four cheek 104, a five cheek 106, and a six cheek 108. The three cheek 102 is connected to the four cheek 104 by a two pin 110. The four cheek 104 is in turn connected to the five cheek 106 by a main journal pin 112. The five cheek 106 is connected to the six cheek 108 by a three pin 114.

In accordance with the preferred parting line strategy, the parting line of the mold at the front and the rear of the crankshaft 100 starts in a vertical direction in line with the one pin 116 and the four pin 118. To achieve this parting line strategy, the crankshaft 100 is divided in half vertically at the front and the rear bays.

As the parting line approaches the cheek three 102, it is directed toward the two pin 110 so that the two pin, which is cylindrical in shape, can be divided at its centerline. The parting line has a first portion 120 that extends generally across the two pin 110 in a generally horizontal direction between points 122 and 124. It is preferred that the parting line first portion 120 extend across the centerline of the two pin 110. The parting line has a second portion 126 that is formed across the side of the three cheek 104. The second portion 126 of the parting line begins at point 128 located on the edge 130 of the three cheek 104 and located in line with the centerline of the two pin 110. The second portion 126 angles from the point 128 across the three cheek 104 to a point 132 on the opposing edge 134 of the three cheek 104 and located in line with the centerline of the main journal pin 112. This type of parting divides the cheek section 104 diagonally in half.

The parting line has a third portion 136 that traverses across the main journal pin 112 in a generally horizontal direction between points 138 and 140. The third portion 136 preferably extends across the centerline of the main journal pin 112 and divides it in half. The parting line has a fourth portion 142 that begins at a point 144 located in line with the centerline of the main journal pin 112 and on the edge 146 of the five cheek 106. The fourth portion 142 of the parting line angles toward the opposing edge 148 of the five cheek 106 and terminates at a point 150 in line with the centerline of the three pin 114. This again divides the cheek section 106 in half diagonally.

The parting line has a fifth portion 152 that traverses across the three pin 114 in a generally horizontal direction between points 154 and 156. The fifth portion 152 extends across the centerline of the three pin 114 and divides it in half. The parting line also has a sixth portion 158 that begins at a point 160 located in line with the centerline of the three pin 114 and on the edge 162 of the six cheek 108. The sixth portion 158 of the parting line angles toward the opposing edge 164 of the six cheek 108 and terminates at a point 166 in line with the centerline of the four pin 118. This again divides the cheek section 108 in half diagonally.

In order to generate this type of parting line geometry, the horizontal cheeks 102, 104, 106, 108 are modified to eliminate any negative draft conditions that would occur. This is preferably accomplished by modifying the cheek bulges to produce a flat section 168 on each cheek 104, 106, 108 at the parting traverse areas. These flat sections 168 preferably produce compound topography in this area to reduce the balance task and minimize mass increase. As further shown, the crankshaft has a plurality of lubrication passages 170 formed therein to assist in keeping the crankshaft and its mechanical connectors lubricated. The passages 170 may be formed in the crankshaft by casting, drilling or other known forming methods.

This type of parting line strategy helps promote uniform sections on each side of the horizontal pin/cheek areas of the crankshaft 10. The molding process is enhanced reducing mold separation and mismatch in these areas. The flash that occurs during the casting process can now be mechanically removed as opposed to manual deflashing. This is because the diagonally oriented flash can be more easily removed by the trim die without causing undue stress or strain on the trim die.

While particular embodiments of the invention have been shown and described, numerous variations and alternate embodiments will occur to those skilled in the art. Accordingly, it is intended that the invention be limited only in terms of the appended claims.

What is claimed is:

1. A parting line strategy for a crankshaft, comprising:
   a crankshaft having a plurality of cheeks, including a three cheek, a four cheek, a five cheek, and a six cheek, said three cheek being connected to said four cheek by a two pin, said four cheek being connected to said five cheek by a main journal pin, and said five cheek being connected to said six cheek by a three pin;
   a parting line having a plurality of portions located along said crankshaft;
   each of said two pin, said main journal pin, and said three pin having one of said plurality of portions of said parting line extending generally across a respective centerline thereof; and
   at least one of said plurality of parting line portions extending generally diagonally across a face of each of said four, five and six cheeks.

2. The parting line strategy as recited in claim 1, wherein said at least one of said plurality of parting line portions that extends across said face of each of said four, five and six of cheeks begins at a point along said centerline of an adjacent one of said pins and terminates at a point along said centerline of another adjacent one of said pins.

3. The parting line strategy as recited in claim 1, wherein said at least one of said four, five, and six cheeks has a generally flat portion on said face along which said parting line portion is formed.

4. The parting line strategy as recited in claim 3, wherein said at least one parting line portion that extends across said generally flat portion of said face of at least one of said four, five or six cheeks divides said generally flat portion diagonally in half.

5. The parting line strategy as recited in claim 1, wherein said parting line portion that extends across said face of said four cheek begins at a point along said centerline of said two pin and terminates at a point along said centerline of said main journal pin.

6. The parting line strategy as recited in claim 5, wherein said parting line portion that extends across said face of said five cheek begins at a point along said centerline of said main journal pin and terminates at a point along said centerline of said three pin.

7. The parting line strategy as recited in claim 6, wherein said parting line portion that extends across said face of said six cheek begins at a point along said centerline of said three pin and terminates at a point along a centerline of a four pin.

8. A crankshaft parting line configuration, wherein the crankshaft includes a plurality of cheeks, including a three cheek, a four cheek, a five cheek, and a six cheek, a plurality of pins, including a two pin extending between the three cheek and the four cheek, a main journal pin extending between the four cheek and the five cheek, and a three pin extending between the five cheek and the six cheek, the parting line configuration comprising:

a parting line extending along the crankshaft, said parting line having a plurality of portions;

a first portion of said parting line extending generally across an outer surface of the two pin;

a second portion of said parting line extending generally upward and across a face of the four cheek from one edge of said face to an opposing edge;

a third portion of said parting line extending generally across an outer surface of the main journal pin; and a fourth portion of said parting line extending generally upward and across a face of the five cheek from one edge of said face to an opposing edge.

9. The crankshaft parting line configuration as recited in claim 8, further comprising:

a fifth portion of said parting line extending generally across an outer surface of the three pin; and a sixth portion of said parting line extending generally downward and across a face of the six cheek from one edged of said face to an opposing edge.

10. The crankshaft parting line configuration as recited in claim 9, wherein each of said second and fourth portions of said parting line were formed on a generally flat section of said respective cheek face.

11. The crankshaft parting line configuration as recited in claim 8, wherein each of said second and fourth portions of said parting line extend in a generally diagonal direction to bisect said respective generally flat section in half.

12. The crankshaft parting line configuration as recited in claim 9, wherein each of said first and third portions of said parting line extend generally across a centerline of said respective pin.

13. The crankshaft parting line configuration as recited in claim 12, wherein said second portion of said parting line extends across said face of said four cheek from a point on said one edge that is in line with said centerline of said two pin to a point on said opposing edge that is in line with said centerline of said main journal pin.

14. The crankshaft parting line configuration as recited in claim 13, wherein said fourth portion of said parting line extends across said face of said five cheek from a point on said one edge that is in line with said centerline of said main journal pin to a point on said opposing edge that is in line with said centerline of said three pin.

\* \* \* \* \*